US 6,738,536 B2

(12) United States Patent
Boettcher et al.

(10) Patent No.: US 6,738,536 B2
(45) Date of Patent: May 18, 2004

(54) WAVELENGTH TUNABLE FILTER DEVICE FOR FIBER OPTIC SYSTEMS

(75) Inventors: Evelyn Boettcher, Greenbelt, MD (US); Sandeep T. Vohra, Ellicott City, MD (US); Paul J. Matthews, Ellicott City, MD (US); Paul D. Biernacki, Fairfax, VA (US)

(73) Assignee: Optinel Systems, Inc., Elkridge, MD (US)

( * ) Notice: Subject to any disclaimer, the term of this patent is extended or adjusted under 35 U.S.C. 154(b) by 0 days.

(21) Appl. No.: 10/022,360

(22) Filed: Dec. 20, 2001

(65) Prior Publication Data

US 2003/0128924 A1 Jul. 10, 2003

(51) Int. Cl.[7] ................................. G02F 1/295
(52) U.S. Cl. .................. 385/10; 385/37; 398/84; 398/87
(58) Field of Search ............... 385/10, 12, 13, 385/37; 359/130; 398/84, 87

(56) References Cited

U.S. PATENT DOCUMENTS

| 4,589,285 A | 5/1986 | Savit |
| 5,022,730 A | 6/1991 | Cimimi et al. |
| 5,042,898 A | 8/1991 | Morey et al. |
| 5,159,601 A | 10/1992 | Huber |
| 5,208,819 A | 5/1993 | Huber |
| 5,367,589 A | 11/1994 | MacDonald et al. |

(List continued on next page.)

FOREIGN PATENT DOCUMENTS

WO  WO 96/23372  8/1996

OTHER PUBLICATIONS

Derickson, Dennis, "Fiber Optic Test and Measurement", Hewlett Packard Co., 1998, pp. 95–109.

Dynamic Dispersion Compensation Using Bandwidth Tunable fiber Bragg Gratings, S.T. Vohra et al.

IEEE Photonics Technology Letters, vol. 11, No. 7, Jul. 1999, Electrically Tunable Power Efficient Dispersion Compensating Fiber Bragg Grating, Benjamin J. Eggleton et al, pp. 854–856 and 765 & 766.

Journal of Lightwave Technology, vol. 17, No. 7, Jul. 1999, Bragg Grating Fast tunable Filter for Wavelength Division Multiplexing, Alessandro Iocco et al, pp. 1217–1221.

Dispersion cancellation linearly chirped Bragg grating filters in optical waveguides, Fracois Ouellette, Oct. 1987/vol. 12, No. 10, Optics Letters, pp. 847–849.

Journal of Lightwave Technology, vol. 17, No. 7, Jul. 1999, General Optical All–Pass Filter Structures for Dispersion Control in WDM Systems, G. Lenz et al, pp. 1248–1254.

*Primary Examiner*—Robert Kim
*Assistant Examiner*—Michael H. Caley
(74) *Attorney, Agent, or Firm*—Pillsbury Winthrop LLP (57) ABSTRACT

A wavelength tunable filter for optical communication systems has an optical fiber containing a Bragg grating disposed within a compliant support block. A length of the fiber is wrapped in a spiral of fixed pitch around the longitudinal axis of a cylindrical polymer support block. The support block is placed within a support frame to which a micrometer screw assembly is attached and oriented to apply a variable mechanical load substantially parallel to the longitudinal axis of the cylindrical support block. Application of the load introduces a strain on the support block, changing the period of the refractive index in the fiber Bragg grating with a resulting shift in the Bragg reflection peak.

13 Claims, 5 Drawing Sheets

U.S. PATENT DOCUMENTS

| | | | |
|---|---|---|---|
| 5,380,995 A | 1/1995 | Udd et al. | |
| 5,384,884 A | 1/1995 | Kashyap et al. | |
| 5,392,117 A | 2/1995 | Belleville et al. | |
| 5,394,415 A | 2/1995 | Zucker et al. | |
| 5,397,891 A | 3/1995 | Udd et al. | |
| 5,401,956 A | 3/1995 | Dunphy et al. | |
| 5,430,574 A | 7/1995 | Tehrani | |
| 5,469,520 A | 11/1995 | Morey et al. | |
| 5,557,468 A | 9/1996 | Ip | |
| 5,591,965 A | 1/1997 | Udd | |
| 5,608,562 A | 3/1997 | Delavaux et al. | |
| 5,612,805 A | 3/1997 | Fevrier et al. | |
| 5,655,040 A | 8/1997 | Chesnoy et al. | |
| 5,673,129 A | 9/1997 | Mizrahi | |
| 5,680,489 A | 10/1997 | Kersey | |
| 5,680,491 A | 10/1997 | Shigematsu et al. | |
| 5,691,989 A | 11/1997 | Rakuljic et al. | |
| 5,691,999 A | 11/1997 | Ball et al. | |
| 5,694,501 A | 12/1997 | Alavie et al. | |
| 5,706,301 A | 1/1998 | Lagerström | |
| 5,712,717 A | 1/1998 | Hamel et al. | |
| 5,719,971 A | 2/1998 | Smith | |
| 5,745,436 A * | 4/1998 | Bittleston | 367/20 |
| 5,748,349 A | 5/1998 | Mizrahi | |
| 5,751,243 A | 5/1998 | Turpin | |
| 5,754,321 A | 5/1998 | Giles et al. | |
| 5,771,112 A | 6/1998 | Hamel et al. | |
| 5,778,118 A | 7/1998 | Sridhar | |
| 5,780,843 A | 7/1998 | Cliche et al. | |
| 5,784,191 A | 7/1998 | Wood | |
| 5,793,907 A | 8/1998 | Jalali et al. | |
| 5,805,751 A | 9/1998 | Kewitsch et al. | |
| 5,818,585 A | 10/1998 | Davis et al. | |
| 5,825,792 A | 10/1998 | Villeneuve et al. | |
| 5,838,437 A | 11/1998 | Miller et al. | |
| 5,889,901 A | 3/1999 | Anderson et al. | |
| 5,892,582 A | 4/1999 | Bao et al. | |
| 5,915,051 A | 6/1999 | Damask et al. | |
| 5,915,052 A | 6/1999 | Ball | |
| 5,953,141 A | 9/1999 | Liu et al. | |
| 5,956,355 A | 9/1999 | Swanson et al. | |
| 5,963,567 A | 10/1999 | Veselka et al. | |
| 5,974,206 A | 10/1999 | Bricheno et al. | |
| 5,982,962 A | 11/1999 | Koops et al. | |
| 5,982,963 A | 11/1999 | Feng et al. | |
| 5,987,197 A | 11/1999 | Kersey | |
| 5,987,200 A | 11/1999 | Fleming et al. | |
| 5,991,476 A | 11/1999 | Baney et al. | |
| 5,995,255 A | 11/1999 | Giles | |
| 5,999,671 A | 12/1999 | Jun et al. | |
| 6,008,920 A | 12/1999 | Hendrix | |
| 6,035,080 A | 3/2000 | Henry et al. | |
| 6,044,189 A | 3/2000 | Miller | |
| 6,055,081 A | 4/2000 | Koyano et al. | |
| 6,055,348 A | 4/2000 | Jin et al. | |
| 6,069,719 A | 5/2000 | Mizrahi | |
| 6,072,567 A | 6/2000 | Sapack | |
| 6,088,088 A | 7/2000 | Fortenberry | |
| 6,097,487 A | 8/2000 | Kringlebotn et al. | |
| 6,104,515 A | 8/2000 | Cao | |
| 6,111,681 A | 8/2000 | Mizrahi et al. | |
| 6,115,122 A | 9/2000 | Bao et al. | |
| 6,118,530 A | 9/2000 | Bouevitch et al. | |
| 6,122,418 A | 9/2000 | Ellis | |
| 6,128,427 A | 10/2000 | Espindola et al. | |
| 6,134,003 A | 10/2000 | Tearney et al. | |
| 6,137,924 A | 10/2000 | Strasser et al. | |
| 6,141,470 A | 10/2000 | Espindola et al. | |
| 6,148,127 A | 11/2000 | Adams et al. | |
| 6,154,588 A | 11/2000 | Kai | |
| 6,154,590 A | 11/2000 | Jin et al. | |
| 6,157,477 A | 12/2000 | Robinson | |
| 6,169,829 B1 | 1/2001 | Laming et al. | |
| 6,169,831 B1 | 1/2001 | Adams et al. | |
| 6,185,023 B1 | 2/2001 | Mizrahi | |
| 6,188,499 B1 | 2/2001 | Majima | |
| 6,201,909 B1 | 3/2001 | Kewitsch et al. | |
| 6,208,443 B1 | 3/2001 | Liu et al. | |
| 6,249,365 B1 | 6/2001 | Mizrahi et al. | |
| 6,278,811 B1 * | 8/2001 | Hay et al. | 385/13 |

* cited by examiner

WAVELENGTH TUNABLE FILTER DEVICE FOR FIBER OPTIC SYSTEMS

BACKGROUND

1. Field of Invention

This invention relates to devices for use in optical communication systems. More specifically, it relates to tunable filters for optical communications systems.

2. Discussion of Related Art

The current trend towards increased channel density in wavelength division multiplexed (WDM) optical communication systems, with increasing numbers of channels per fiber and increasingly narrow channel bandwidths, has intensified the need for simple, efficient methods to precisely control signal flow and content. A basic requirement for this technology is the availability of a tunable optical filter. Such a device may be used as a dynamic channel selector in a WDM system, as part of a reconfigurable optical add-drop multiplexer, or as a component in an optical monitor. Desired device characteristics include a well-defined passband and a small insertion loss. Chromatic and polarization-mode dispersion attributable to the filter should also be minimized.

Conventional fiber Bragg gratings are commonly used in fiber optic systems for selectively controlling and modifying specific wavelength bands of light. A grating reflects light in a well-defined, narrow bandwidth centered around a wavelength directly related to the period of the grating. Such a device may be used as a tunable filter if the grating period can be controllably and reversibly altered. This has been accomplished in the past with such methods as the application of heat to a material rigidly attached to the grating fiber, with the subsequent thermally induced strain to the grating and temperature dependent changes in the refractive index altering the grating period, and thus shifting the reflected waveband peak. One drawback to such an approach is a relatively slow response time. Others have employed piezoelectric actuators attached to the portion of fiber containing the Bragg grating in such a fashion as to stretch it on application of an applied voltage. The strain produced by piezoelectric actuation, however, is relatively small, which limits the tuning range of the device. Another potential disadvantage of this method is the need for continuous application of relatively high voltages.

A copending patent application commonly assigned to the same assignee as this application describes a tunable dispersion compensating device in which a fiber Bragg grating is embedded in a compliant material at an angle to a load-bearing surface ("Tunable Dispersion Compensating Bandwidth Device for Fiber Optic System," application Ser. No. 09/957,022 filed Sep. 21, 2001), the entire contents of which is incorporated herein by reference. In that device, a non-linear strain results from an applied load on the load bearing surface to result in a chirped Bragg grating within the fiber.

SUMMARY

A wavelength tunable filter device for fiber optic systems has a compliant support block that has a longitudinal axis and a load-receiving surface oriented substantially orthogonal to the longitudinal axis. The load receiving surface is capable of receiving a load substantially orthogonal to said surface. The device also has a portion of fiber containing a Bragg grating disposed in the compliant support block and extending substantially along, and at an angle to said longitudinal axis.

A wavelength division multiplexed optical communication system has a plurality of optical transmitters, an optical multiplexer in optical communication with the plurality of optical transmitters, a signal transmission waveguide in optical communication with the optical multiplexer, a wavelength tunable optical filter unit in optical communication with the signal transmission waveguide, an optical demultiplexer in optical communication with the signal transmission waveguide, and a plurality of receivers in communication with the demultiplexers.

The wavelength tunable optical filter unit has a compliant support block having a longitudinal axis and a load-receiving surface oriented substantially orthogonal to the longitudinal axis. The load-receiving surface is suitable to receive an applied load in a direction substantially parallel to the longitudinal axis. A portion of fiber containing a Bragg grating is disposed in the compliant support block and extends substantially along, and at an angle to, the longitudinal axis of the compliant support block.

A method of making a wavelength tunable optical filter device for optical communications systems includes disposing a portion of fiber containing a Bragg grating into a cylindrical mold, pouring support material into the cylindrical mold, said support material being compliant when it sets, and attaching a load-supplying assembly to a top surface of the support material.

BRIEF DESCRIPTION OF THE DRAWINGS

These and other objects and advantages of the invention will become more apparent and more readily apparent and more readily appreciated from the following detailed description of the presently preferred exemplary embodiments of the invention, taken in conjunction with the accompanying drawings, of which.

DETAILED DESCRIPTION OF EMBODIMENTS OF THE INVENTION

In the following description, for purposes of explanation and not limitation, specific details are set forth such as particular optical and electrical circuits, circuit components, techniques, etc. in order to facilitate a thorough understanding of the present invention. However, the invention may be practiced in other embodiments that depart from these specific details. The terms optical and light are used in a broad sense in this description to include both visible and non-visible regions of the electromagnetic spectrum. Currently, infrared light is used extensively in transmitting signals in optical communications systems. Infrared light is included within the broad meaning of the term light as used herein.

Figure 1:
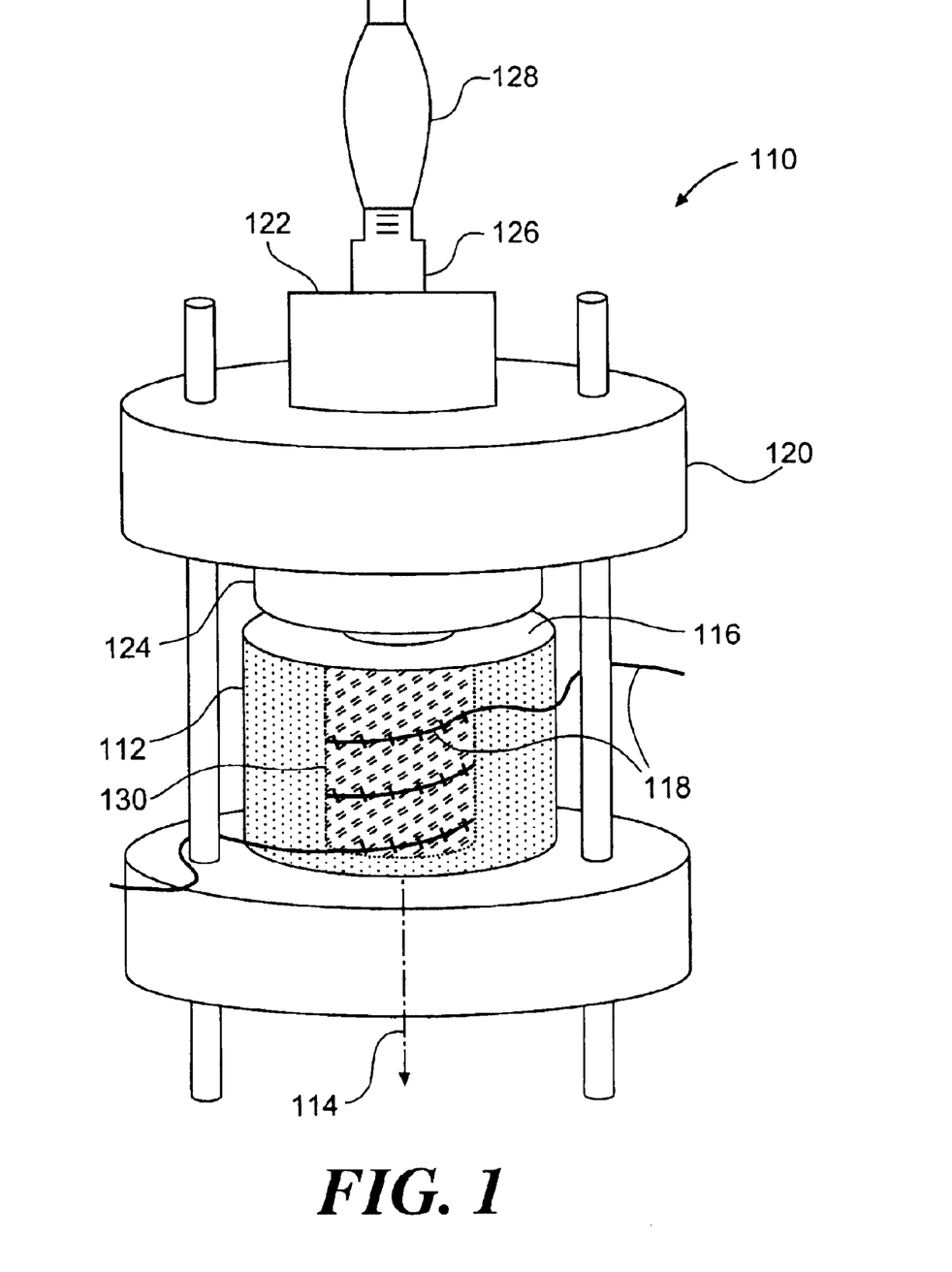
FIG. 1 is a schematic illustration of a wavelength-tunable optical filter according to an embodiment of the invention.

FIG. 1 is a schematic illustration of an embodiment of the invention. A wavelength-tunable optical filter 110 has a cylindrically shaped compliant support block 112 that has a longitudinal axis 114 and a load-receiving surface 116 oriented substantially orthogonal to the longitudinal axis 114. A portion of optical fiber 118 having at least a section with a fiber Bragg grating written therein is disposed within the cylindrically shaped compliant support block 112, a fiber Bragg grating being a length of optical fiber along which the refractive index varies periodically and which reflects light in a narrow wavelength band centered about a wavelength directly related to the periodicity. In one embodiment of the invention, said portion of optical fiber 118 is wrapped around a pre-set cylindrical or conically shaped piece 130. The cylindrical support block 112 is placed within a support frame 120. The side of said cylindrical support block 112 is left exposed so as to allow for expansion on application of an applied load in a direction substantially parallel to the longitudinal axis of the cylinder. A machined fixture 122, suitable to hold a micrometer screw assembly, is attached to the support frame. A rigid plate 124 is placed proximate to one end face of said cylindrical support block 112. A micrometer screw assembly 126 is attached to the machined fixture 122 proximate to the rigid plate 124. A micrometer screw 128 is in contact with the rigid circular plate 124, and oriented substantially parallel to the longitudinal axis 114 of the cylindrical support block 112.

Figure 2:
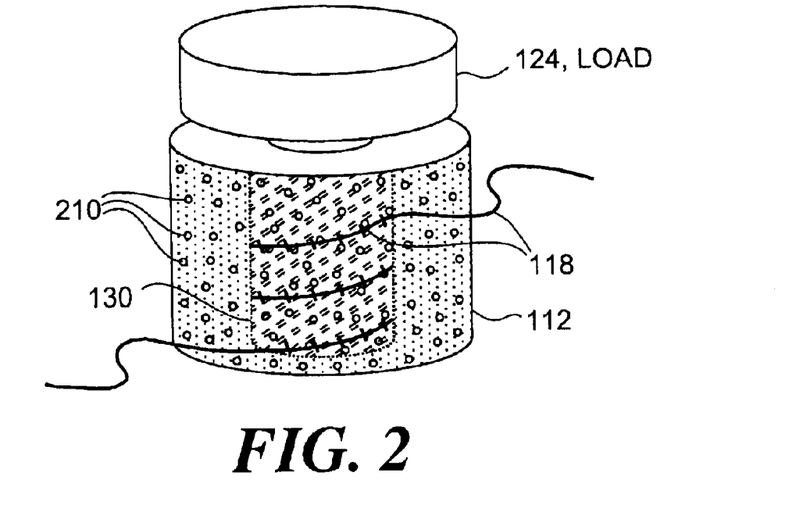
FIG. 2 is a schematic illustration of a wavelength-tunable optical filter according to an embodiment of the invention wherein glass microspheres are dispersed within the compliant support block.

The support block 112 is composed of a material which may be compressed or stretched by an applied force in a substantially reversible fashion, such that its initial shape is substantially restored on removal of the applied force. Suitable materials from which to make the compliant support block 112 include elastic and visco-elastic polymers, but are not limited to those materials. In an alternative embodiment, illustrated in FIG. 2, glass microspheres 210 may be dispersed within the compliant support block 112 in order to alter the mechanical properties of the block.

In one embodiment the compliant support block 112 is fabricated by pouring the selected support block material into a cylindrical mold within which said portion of fiber 118 containing the fiber Bragg grating is held in place. This may be accomplished by wrapping said portion of fiber 118 containing the fiber Bragg grating around said pre-set cylindrical or conically shaped piece 130, or other suitably shaped piece, comprised of the material of which the compliant support block is to be made. Said portion of fiber 118 containing the fiber Bragg grating may then be held in place on the piece around which it is wrapped with a suitable adhesive, and said piece is then inserted into the cylindrical mold before pouring of the support block material into the mold. Said portion of fiber 118 may also be pre-coated with support block material before pouring to assure good adhesion to the fiber. In one embodiment said portion of fiber 118 is wrapped in a spiral fashion, at a fixed pitch and radius, within the compliant support block 112. The axis of the fiber spiral is coincident with the longitudinal axis of the cylindrical support block 112. In a prototype of the current invention an 8 mm length of fiber was embedded within the support block. The optical fiber enters and exits through the side of the cylindrical support block 112 in the prototype, but other entrance and exit locations are possible.

An aluminum alloy is a suitable material for said rigid plate 124. However, said plate 124 is not limited to only aluminum alloys.

In the described embodiment the micrometer screw assembly 126 has one micrometer screw 128, but the micrometer screw assembly 126 may have a plurality of micrometer screws in other embodiments.

In this embodiment the invention functions by adjustment of the micrometer screw 128 to apply a downward variable load to the rigid plate 124, the direction of the load being substantially parallel to the longitudinal axis of the cylindrical support block 112 and substantially uniform over the area of the cylinder end face. The load is transferred through the rigid plate 118 to the cylindrical support block 112, resulting in a radial deformation of the cylindrical support block 112. This deformation produces an axial strain on the embedded portion of fiber 118, with the exact strain profile dependent on the precise location and orientation of the fiber within the support block 112. The resultant strain on the embedded portion of fiber 118 causes an expansion in the period of the Bragg grating contained therein, and thus an upward shift in the Bragg wavelength of the device.

It should be noted that the applied load may be generated in any number of ways, including a stepper motor, a DC motor, piezoelectric elements, etc., instead of a micrometer (s).

It should also be noted that the invention may be configured such that the portion of fiber containing a Bragg grating is subject to a compressive force. As optical fibers are more tolerant of compression, this may lead to larger tuning ranges.

The invention may be used in either a transmission or reflection mode, with no restrictions as to how the signal is routed, including the use of a circulator.

Figure 3:
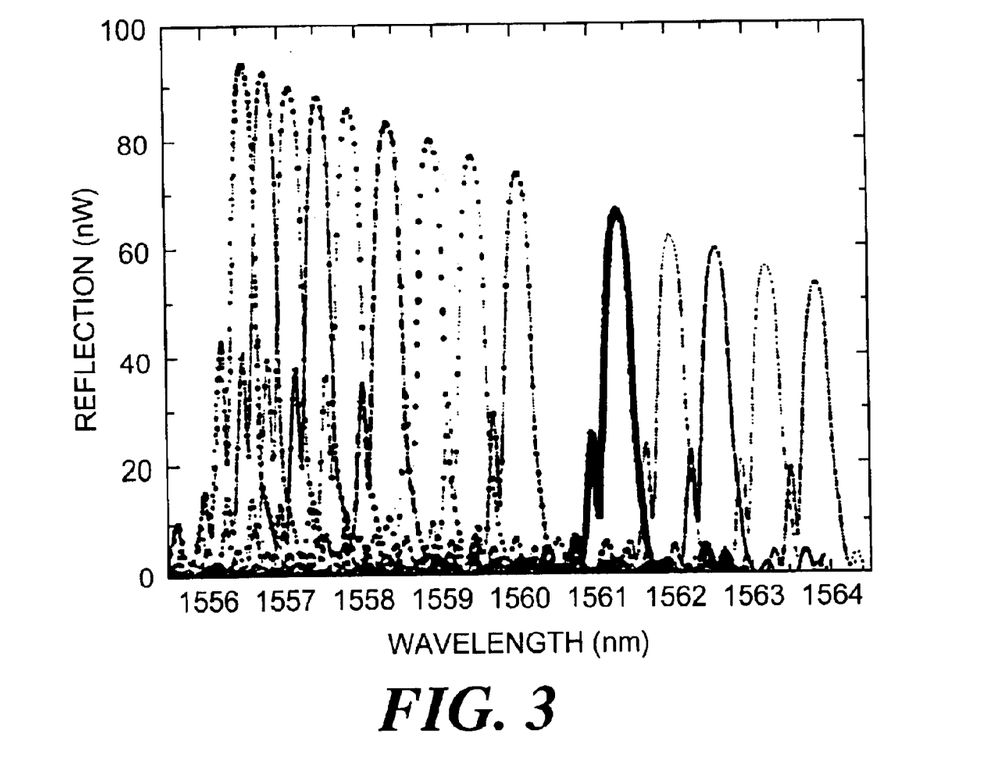
FIG. 3 shows the reflection spectra of a wavelength-tunable optical filter unit, according to an embodiment of the invention, for several values of applied load.
Figure 4:
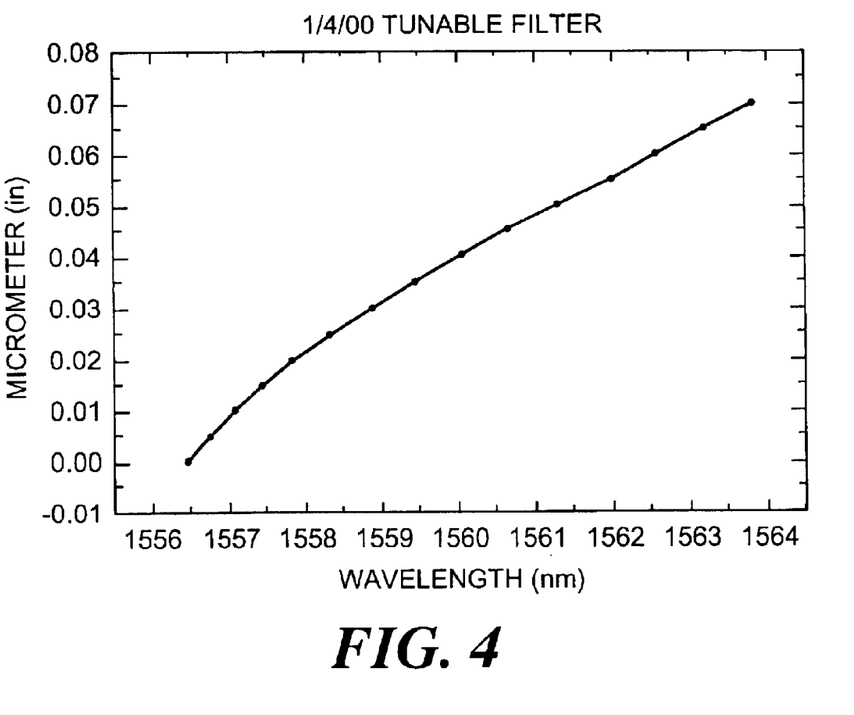
FIG. 4 is a plot of applied load, as related to micrometer setting, as a function of the reflected wavelength peak for a wavelength tunable optical filter unit according to an embodiment of the invention.

The reflection spectra of the invention were measured with an optical spectrum analyzer for a range of applied loads. Reflection spectra are shown as a function of micrometer setting in FIG. 3. FIG. 4 is a graph of the Bragg reflection peak as a function of micrometer setting.

A wavelength tunable optical filtering device according to the invention may be installed at various points within an optical communication system. Such a device may be used as a dynamic channel selector in a WDM system, as part of a reconfigurable optical add-drop multiplexer, or as a component in an optical monitor; but would not be limited to those applications.

Figure 5:
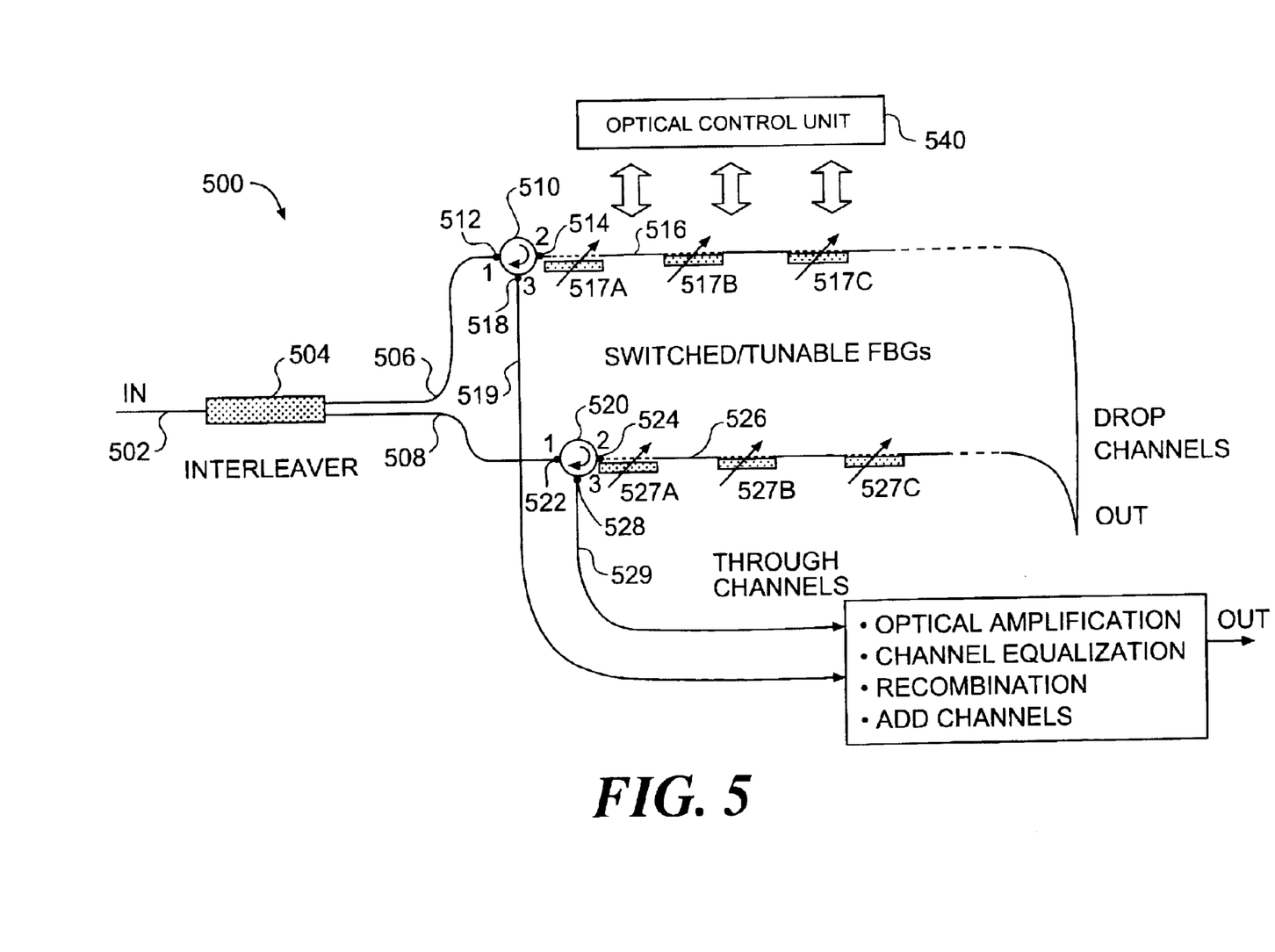
FIG. 5 is a schematic illustration of an optical add/drop multiplexer which utilizes a plurality of wavelength tunable optical filters according to the present invention.

FIG. 5 shows a schematic representation of an add-drop multiplexer 500 which utilizes wavelength tunable optical filters according to an embodiment of the present invention. The incoming signal 502, containing a plurality of wavelengths, enters interleaver 504 and exits interleaver 504 split into optical signal path 506 and optical signal path 508. Each optical signal enters a separate circulator. Optical signal path 506 enters first circulator 510 at port 512 and exits at port 514 to be directed into path 516. In path 516 are disposed a series of tunable fiber-Bragg grating assemblies 517A, 517B, 517C, etc. for selecting respectively wavelength $\lambda_{11}$, $\lambda_{12}$ and $\lambda_{13}$. Each tunable fiber Bragg grating assembly may be a tunable fitter according to the invention such as the tunable filter 110. While three Bragg gratings are shown in path 516, it is understood that there can be one grating, two or more gratings. Each fiber Bragg grating is configured to reflect a portion of optical wavelengths, included in the wavelength division multiplexed optical communication signal, to circulator port 514 while transmitting the remaining wavelengths, that is wavelengths other than $\lambda_{11}$, $\lambda_{12}$ and $\lambda_{13}$. The wavelengths being transmitted correspond to the optical channels to be dropped while the wavelengths reflected towards circulator port 514, to be output by circulator 510 through the optical port 518, correspond to the through channel.

Similarly, optical signal path 508 enters second circulator 520 at port 522 and exits at port 524 to be directed into path 526. In path 526 are disposed a series of fiber-Bragg gratings 527A, 527B, 527C for selecting respectively wavelength $\lambda_{21}$, $\lambda_{22}$, $\lambda_{23}$. While three Bragg gratings are shown in path 526, it is understood that that there can also be one grating, two or more than three gratings. Each fiber Bragg grating is configured to reflect a portion of optical wavelengths included in the wavelength division multiplexed optical communication signal to circulator port 524 while transmitting the remaining wavelengths, that is wavelengths other than $\lambda_{21}$, $\lambda_{22}$, $\lambda_{23}$. The wavelengths being transmitted correspond to the optical channels to be dropped while the wavelengths reflected towards circulator port 524, to be output by circulator 520 through the optical port 528, correspond to the through channel.

Optical path 519, optically communicating with the third circulator port 518, is configured to receive optical wavelengths output by the third circulator port 518 corresponding to the channels not dropped from the wavelength division multiplexed optical communication signal in path 506. The channels in the optical path 519, consisting of $\lambda_{11}$, $\lambda_{12}$, and $\lambda_{13}$ correspond to the through channels.

Similarly, Optical path 529, optically communicating with the third circulator port 528, is configured to receive optical wavelengths output by the third circulator port 528 corresponding to the channels not dropped from the wavelength division multiplexed optical communication signal in path 508. The channels in the optical path 529, consisting of $\lambda_{21}$, $\lambda_{122}$, and $\lambda_{23}$ correspond to the through channels.

Optical path 519 connected to the third optical port of the first circulator 510 carrying wavelengths $\lambda_{11}$, $\lambda_{12}$, and $\lambda_{13}$ and optical path 529 connected to the third optical port of the second circulator 520 carrying wavelengths $\lambda_{21}$, $\lambda_{22}$, and $\lambda_{23}$ are connected to processing unit 530 comprising optical amplification, channel equalization, recombination and addition. Processing unit 530 amplifies, equalizes, combines and adjusts the two signals carried by the two paths 519 and 529.

The optical channel control unit 540 allows for maintaining the fiber Bragg grating within the band guard for selecting the desired wavelengths. In other words, channel-monitoring unit 540, allows for precise wavelength monitoring and feedback to tuning elements as described previously.

The reconfigurable add/drop multiplexer illustrated demonstrates both flexibility and scalability. It is shown that two optical signals can be treated at the same time, and more than two optical signals can be treated in this way by splitting the incoming optical signal into more optical sub-signals and adding circulators and fiber Bragg grating lines to select wavelengths in each optical sub-signal.

Figure 6:
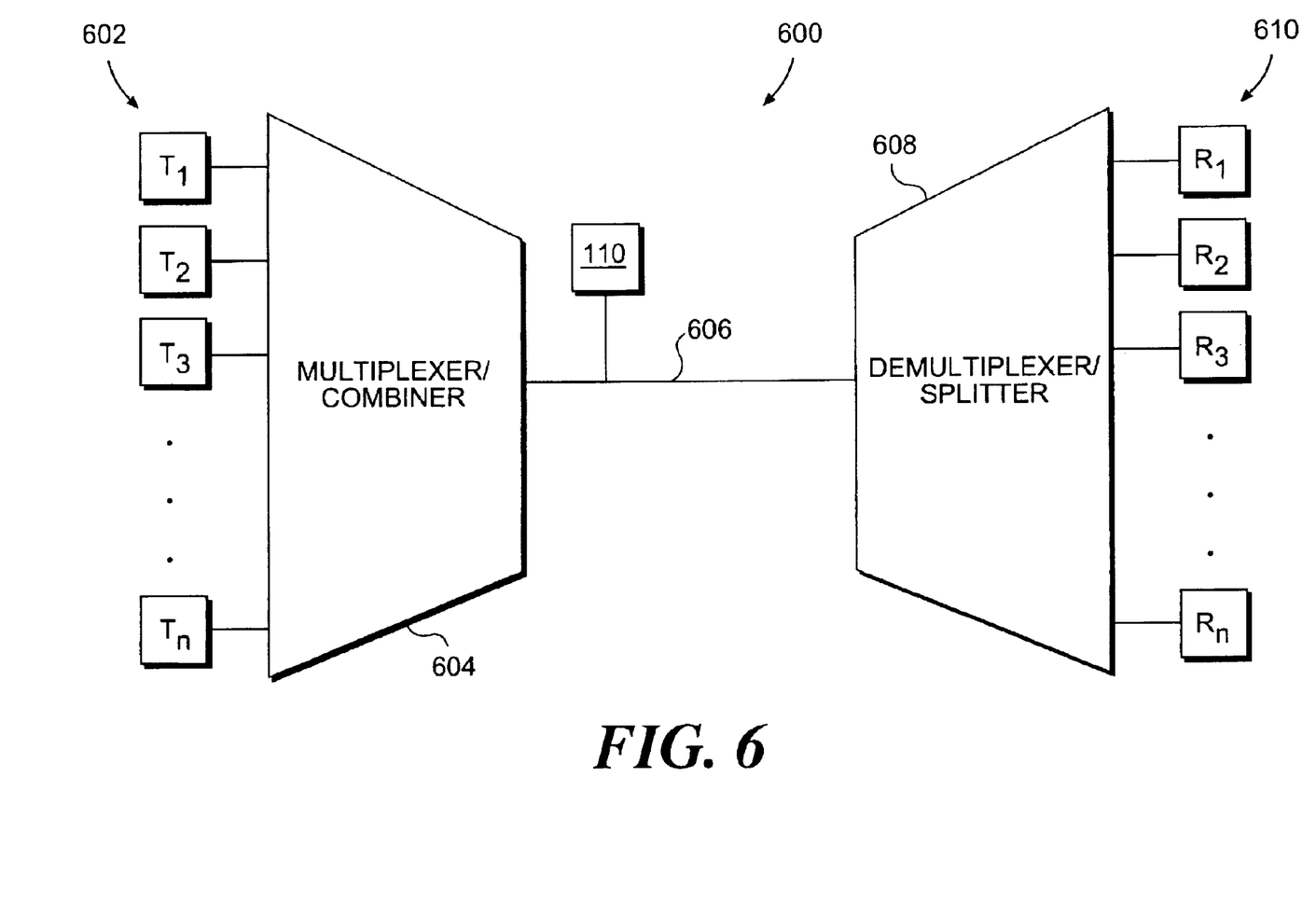
FIG. 6 is a schematic illustration of a wavelength division multiplexed optical communication system which utilizes a wavelength tunable optical filter unit according to an embodiment of the invention.

FIG. 6 is a schematic illustration of a wavelength division multiplexed optical communication system 600 that utilizes a wavelength tunable optical filter unit 110 according to an embodiment of the invention. The wavelength division multiplexed optical communication system 600 has a plurality of optical transmitters 602, an optical multiplexer 604 in communication with the plurality of optical transmitters 602, a signal transmission waveguide 606 in optical communication with the optical multiplexer 604, an optical demultiplexer 608 in optical communication with the signal transmission waveguide 606 and a plurality of receivers 610 in optical communication with the optical demultiplexer.

The wavelength tunable optical filter unit 110 may be inserted at various points within the optical communication system 600, such as along the path of the signal transmission waveguide 606, at either end of the signal transmission waveguide 606, between any one of the optical transmitters 602 and optical multiplexer 604, or between any one of the optical receivers 610 and the optical demultiplexer 608. FIG. 6 illustrates the example in which the wavelength tunable optical filter unit 110 is inserted along the path of the signal transmission waveguide 606. One may also include more than one wavelength tunable optical filter unit within an optical communication system, as needed.

We claim:

1. A wavelength tunable optical filter for optical communications systems, comprising:

a compliant support block having a longitudinal axis and a load-receiving surface oriented substantially orthogonal to said longitudinal axis, said load-receiving surface being suitable to receive an applied load in a direction substantially parallel to said longitudinal axis;

an optical fiber having at least a section with a fiber Bragg grating written therein disposed in said compliant support block and arranged in a configuration at least partially encircling said longitudinal axis of said compliant support block; and a mechanical assembly having a portion thereof in contact with said load-receiving surface of said compliant support block, wherein said fiber Bragg grating has a variation in refractive index along an axial direction thereof, and wherein said mechanical assembly is adapted to provide a selectable load to said load-receiving surface of said compliant support block to select a reflection characteristic of said fiber Bragg grating out of an adjustable range of reflection characteristics.

2. A wavelength tunable filter according to claim 1, wherein said optical fiber having at least a section with a fiber Bragg grating written therein is arranged in a spiral fashion with a fixed pitch around said longitudinal axis.

3. A wavelength tunable optical filter according to claim 1, wherein said mechanical assembly comprises a support frame, said compliant support block being disposed within said support frame, wherein said support frame reserves space along a side of said compliant support block suitable to allow said compliant support block to expand orthogonally to said longitudinal axis in response to said applied load in said direction substantially parallel to said longitudinal axis.

4. A wavelength tunable optical filter according to claim 1, wherein said mechanical assembly comprises a substantially rigid plate disposed on said load-receiving surface of said compliant support block.

5. A wavelength tunable optical filter according to claim 1, wherein a material of said compliant support block comprises a polymer.

6. A wavelength tunable optical filter according to claim 5, wherein said polymer of said compliant support block is selected from the group consisting of a visco-elastic polymer and an elastic polymer.

7. A wavelength tunable optical filter according to claim 1, wherein said compliant support block comprises a plurality of microspheres disposed therein.

8. A wavelength tunable optical filter according to claim 7, wherein said plurality of microspheres are glass microspheres.

9. A wavelength tunable optical filter according to claim 1, wherein said compliant support block has a cylindrical shape, having an end face, said end face of said compliant support block being said load-receiving surface.

10. A wavelength tunable optical filter according to claim 1, wherein said fiber Bragg grating disposed in said compliant support block has a spiral configuration, wherein an axis of said spiral configuration of said fiber Bragg grating coincides with said longitudinal axis of said cylindrical support block.

11. A wavelength tunable optical filter for optical communications systems, comprising:
   a compliant support block having a longitudinal axis and a load-receiving surface oriented substantially orthogonal to said longitudinal axis, said load-receiving surface being suitable to receive an applied load in a direction substantially parallel to said longitudinal axis;
   an optical fiber having at least a section with a fiber Bragg grating written therein disposed in said compliant support block and arranged in a configuration at least partially encircling said longitudinal axis of said compliant support block;
   a substantially rigid plate disposed proximate said load-receiving surface of said compliant support block; and
   a micrometer assembly attached to said support frame proximate said substantially rigid plate,
   wherein said fiber Bragg grating has a variation in refractive index along an axial direction thereof, and
   wherein said micrometer assembly comprises a micrometer screw member adapted to apply a load to said support block, transferred through said substantially rigid plate.

12. A wavelength division multiplexed optical communication system, comprising:
   a plurality of optical transmitters;
   an optical multiplexer in optical communication with said plurality of optical transmitters;
   a signal transmission waveguide in optical communication with said optical multiplexer;
   a tunable optical filter in optical communication with said signal transmission waveguide;
   an optical demultiplexer in optical communication with said signal transmission waveguide; and
   a plurality of optical receivers in communication with said optical demultiplexer,
   wherein said tunable optical filter comprises:
      a compliant support block having a longitudinal axis and a load-receiving surface oriented substantially orthogonal to said longitudinal axis, said load-receiving surface being suitable to receive an applied load in a direction substantially parallel to said longitudinal axis,
      a fiber Bragg grating disposed in said compliant support block and arranged in a configuration at least partially encircling said longitudinal axis of said compliant support block, and
      a mechanical assembly having a portion thereof in contact with said load-receiving surface of said compliant support block, wherein said fiber Bragg grating has a variation in refractive index along an axial direction thereof, and
      wherein said mechanical assembly is adapted to provide a selectable load to said load-receiving surface of said compliant support block to select a reflection characteristic of said fiber Bragg grating out of an adjustable range of reflection characteristics.

13. An add-drop multiplexer for optical communications systems, comprising:
   an optical circulator having an optical signal input port, an intermediate optical port, and a through channel optical port; and
   a wavelength tunable optical filter in optical communication with said intermediate optical port of said optical circulator,
   wherein said wavelength tunable optical filter comprises:
      a compliant support block having a longitudinal axis and a load-receiving surface oriented substantially orthogonal to said longitudinal axis, said load-receiving surface being suitable to receive an applied load in a direction substantially parallel to said longitudinal axis;
      an optical fiber having at least a section with a fiber Bragg grating written therein disposed in said compliant support block and arranged in a configuration at least partially encircling said longitudinal axis of said compliant support block; and
      a mechanical assembly having a portion thereof in contact with said load-receiving surface of said compliant support block,
      wherein said fiber Bragg grating has a variation in refractive index along an axial direction thereof, and
      wherein said mechanical assembly is adapted to provide a selectable load to said load-receiving surface of said compliant support block to select a reflection characteristic of said fiber Bragg grating out of an adjustable range of reflection characteristics.

* * * * *